United States Patent
Weinman

(10) Patent No.: US 8,194,837 B1
(45) Date of Patent: Jun. 5, 2012

(54) MULTIMEDIA CALL REQUEST SCHEDULING

(75) Inventor: Joseph Weinman, Bedminster, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1813 days.

(21) Appl. No.: 11/319,189

(22) Filed: Dec. 28, 2005

(51) Int. Cl.
*H04M 3/42* (2006.01)
(52) U.S. Cl. ......... 379/201.01; 379/201.02; 379/210.01; 379/201.1
(58) Field of Classification Search ............. 379/201.01, 379/210.01, 201.06, 266.01, 201.1, 201.02, 379/201.07, 201.08; 705/8
See application file for complete search history.

(56) References Cited

U.S. PATENT DOCUMENTS

| | | | |
|---|---|---|---|
| 7,076,043 B2 * | 7/2006 | Curbow et al. | 379/201.06 |
| 7,957,521 B2 * | 6/2011 | Taylor et al. | 379/266.01 |
| 2003/0191676 A1 * | 10/2003 | Templeton | 705/8 |
| 2003/0206619 A1 * | 11/2003 | Curbow et al. | 379/210.01 |
| 2005/0018826 A1 * | 1/2005 | Benco et al. | 379/202.01 |
| 2006/0235994 A1 * | 10/2006 | Wu | 709/238 |

* cited by examiner

*Primary Examiner* — Thjuan K Addy
(74) *Attorney, Agent, or Firm* — Greenblum & Bernstein, P.L.C.

(57) ABSTRACT

Techniques for setting up calls between two or more parties are described. A scheduler, operating in combination with a telecommunications network, may set up calls between two or more parties based on a queue of prioritized and/or communication mode required requests. The calls may be set up when all of the required parties are deemed to be available, based on prior scheduled events, and/or based on presence information. In one embodiment, available modes of communication, such as text, audio, data, video, of each party may be considered based on requested parameters for the call.

10 Claims, 5 Drawing Sheets

MULTIMEDIA CALL REQUEST SCHEDULING

FIELD OF THE INVENTION

The invention relates generally to communication networks. More specifically, the invention relates to methods and systems for multimedia communications, such as telephony, voice over data, such as Voice over Internet Protocol, and video or data conferencing.

BACKGROUND

Busy executives typically have many calls to make to conduct their business and telephone tag is a well known problem in telecommunications. Alice calls Bob, only to get his voice mail or a busy signal. Bob then calls Alice back at some point later, only to get her voice mail. This process may continue for hours, days, or even weeks, until finally one party gets through to the other or the attempt to communicate with each other is just abandoned. This process may continue even though there were numerous times where both were free to talk.

In the hectic business and personal world of today, with many people to talk to and hardly any free time to do it, this problem has grown even more complex. Coupled with the proliferation of multimedia devices and mobile cellular phones and digital assistants, some of which are capable of not only voice but also data and video, finding time to communicate, determining a suitable modality, and prioritizing from among all of the requests can be extremely difficult.

Presently, a calendaring system may be used to arrange a time to make a call. Assistants to each party may coordinate a planned time for the call. Then, at the planned time, one party calls the other. However, there is no manner for knowing if one party is not still on another call, if one party is not at his/her desk, of if one party is out of the office for the day. The calling party may call at the planned time and get a busy signal or voice mail.

SUMMARY

A method and system for remembering which calls need to be made, prioritizing them, and initiating them when all parties are available to communicate is needed. Aspects of the invention include a scheduler, operating in combination with a telecommunications network, configured to set up calls between two or more parties based on a queue of prioritized requests. Calls may be set up when all of the required parties are deemed to be available, based on prior scheduled events, and/or based on presence information. Optionally, the available modes of communication, such as text, audio, data, video, for each party may be considered based on requested parameters for the call.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

The foregoing summary of the invention, as well as the following detailed description of illustrative embodiments, is better understood when read in conjunction with the accompanying drawings, which are included by way of example, and not by way of limitation with regard to the claimed invention.

DETAILED DESCRIPTION

In the following description of various illustrative embodiments, reference is made to the accompanying drawings, which form a part hereof, and in which is shown, by way of illustration, various embodiments in which the invention may be practiced. It is to be understood that other embodiments may be utilized and structural and functional modifications may be made without departing from the scope of the present invention.

Figure 1:
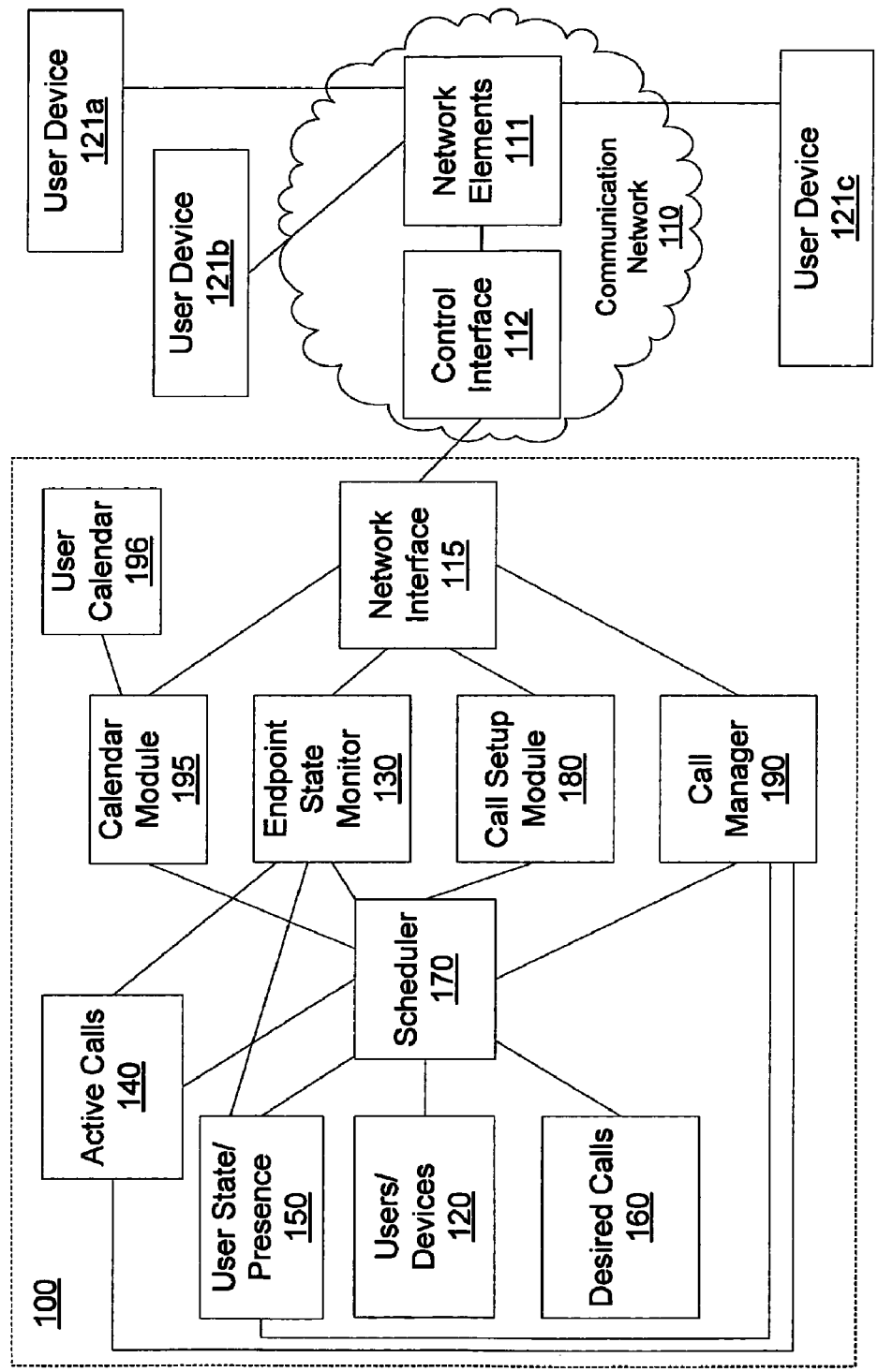
FIG. 1 illustrates an example block diagram of a call request matching system for use in combination with a telecommunications system in accordance with at least one aspect of the present invention.

FIG. 1 illustrates an example block diagram of a call request matching system 100 for use in combination with a telecommunications system in accordance with at least one aspect of the present invention. A communications network 110 enables various user devices 121, shown here as user devices 121a, 121b, and 121c, to communicate with each other. Each user device 121 may be capable of one or more communications modes, such as text and voice. Other communication modes include, but are not limited to, audio, data, video, and multi-user on-line gaming, where each user's "moves" are a means of communication, through one or more communications technologies as are known in the art, such as, short message service, instant messaging (IM), circuit-switched voice, voice over data, such as, voice over frame relay or voice over IP, voice over wireless local area network, video, data, and on-line gaming. It should be understood by those skilled in the art that the number of user devices 121 shown is merely illustrative and that more or fewer than three user devices 121 may be configured to be connected to the communications network 110. Still further, it should be understood that other communication modes and communication technologies may be utilized in accordance with aspects of the present invention.

Communications network 110 may use a verity of technologies. Some examples of traditional circuit switched technology include rotary dialing or dual-tone multi-frequency, dial tone, busy signals, off hook, session initiation protocol (SIP), multimedia gateway control protocol, home location registers, location registrars, IP multimedia system (IMS), H.323, SIP servlets, access control, network admission control, call admission control, and/or any other type of technologies that are known in the art. These technologies may be used for registering a device and user with a network, locating them, allowing calls from the user and/or device, enabling calls to the user and/or device, transcoding between different devices, and providing gateway services for hybrids, such as Public Switched Telecommunications Networks (PSTNs), VoIP, and the like. It will be appreciated that communications network 110 in fact may comprise multiple sub-networks from different service providers or be composed of different technologies.

As shown in FIG. 1, communications network 110 includes a control interface 112 and network elements 111. Network elements 111 may include analog circuit switches, digital circuit switches, routers, gateways, optical add/drop multiplexers, cell sites, billing systems, regeneration components, amplifiers, antennae, subscriber loop carrier systems, cable head-ends, wireless access points, microwave systems, digital radios, satellite, game servers, chat servers, video conference bridges, audio conference bridges, among other devices, as are known in the art, for accessing, transporting, protocol converting, transcoding, transrating, and/or otherwise processing communications signals between endpoint devices. User devices 121 may be any of a variety of communications devices, including, but not limited to, cellular phones, personal computers, mobile wireless laptops, personal digital assistants, gaming consoles including handheld controllers, home multimedia systems, video conferencing devices, traditional PSTN phones, cordless phones, wired phones, VoIP terminal adapters, and handsets.

Communications network 110 is capable, through control interface 112, of being directed to set up a call between two or more parties, of detecting user presence and activity/state, such as is a user currently engaged in use of a device such as typing on a keyboard and what is her current activity/state. Examples of a current activity/state include, is the user busy on a voice call, available to make or receive calls, or away from a device, sometimes referred to in various contexts as "be right back," "out of office," or "away messages." These states may be considered to fall into four general categories: 1) "Not Present" and therefore "Not Available to Communicate"; 2) "Present" and "Not Interested in Communicating"; 3) "Present" and "Available to Communicate"; and 4) "Present" and "Already Communicating." In general, a user can transition from any one of these states to any other at any time or remain in a given state for any amount of time.

As shown, system 100 includes a network interface 115, a users/devices database 120, an endpoint state monitor 130, an active calls database 140, a user state/presence database 150, a desired calls database 160, a scheduler 170, a call setup module 180, a call manager 190, a calendar module 195, and a user calendar 196. An illustrative example of users/devices database 120 is as shown in Table 1.

TABLE 1

| USER | DEVICE ID | DEVICE TYPE | DEVICE MODES |
| --- | --- | --- | --- |
| John Doe | 908-555-1234 | POTS Phone | Voice |
| John Doe | 192.11.37.240 | Personal Computer | Voice, Data, Video |
| John Doe | 908-555-1225 | Cell Phone | Voice, SMS, Video |
| Jane Doe | 908-555-2345 | POTS Phone | Voice |
| ... | ... | ... | ... |

It should be appreciated by those skilled in the art that the actual format and structure of users/device database 120 may vary and that the present invention is not so limited to any particular configuration. For example, other information may be included. Users/devices database 120 may be multiple relational database tables, bitmap indexes, and/or other means of storing data. Data within may include information on a user, such her name, account number(s), and billing address. The data may include information corresponding to the device(s) of the user, such as a network address, a telephone number, a screen name, and an IP address. Other data may include the type of device, manufacturer, serial number and/or other identification means like a SIM (Subscriber Identification Module) or MAC address, and the modes of communication that the device is enabled to engage in, such as voice, video, and/or audio. In some embodiments for use in combination with some networks, users/devices database 120 may have more information. In other embodiments for use in combination with other networks, users/devices database 120 may have less information, such as merely a user name or identifier, like bob@uspto.gov or equivalently a screen name, like "joeweinmanfromjersey."

An illustrative example of active calls database 140 is as shown in Table 2.

TABLE 2

| USER | COMMUNICATING WITH | MODE |
| --- | --- | --- |
| joeweinmanfromjersey | Jane Doe | Voice |
| Jane Doe | joeweinmanfromjersey | Voice |
| Jane Doe | bob@uspto.gov | Video |
| John Doe | John Smith, Tom Jones | Voice |
| John Smith | John Doe, Tom Jones | Voice |
| Tom Jones | John Doe, John Smith | Voice |
| ... | ... | ... |

It should be appreciated by those skilled in the art that the actual format and structure of active calls database 140 may vary and that the present invention is not so limited to any particular configuration. Active calls database 140 may be adapted for greater performance for queries and updates, such as through conversion to $3^{rd}$ normal form, sorting by a user, and usage of indexes and keys. Also, call occurrences may be numbered uniquely. For example, three individuals may be communicating via call instance 123456789, which uniquely identifies a voice and video call.

An illustrative example of user state/presence database 150 is as shown in Table 3.

TABLE 3

| USER | DEVICE | PRESENT | STATE |
| --- | --- | --- | --- |
| joeweinmanfromjersey | 212-555-3456 | Present | Already Communicating |
| John Doe | 908-555-1234 | Present | Already Communicating |
| Jane Doe | 908-555-2345 | Present | Already Communicating |
| bob@uspto.gov | 192.168.34.12 | Present | Already Communicating |
| John Smith | 23.34.45.56 | Present | Already Communicating |
| Tom Jones | 908-555-9876 | Present | Already Communicating |
| Sleepyone@att.net | No | Not Present | Not Available to Communicate |
| Socialbutterfly@att.net | 908-555-1111 | Present | Available to Communicate |
| Socialbutterfly@att.net | Social-butterfly@attnet | Present | Available to Communicate |
| Socialbutterfly@att.net | 908-555-9999 | Not Present | Not Available to Communicate |
| Busybee@attnet | Yes | Present | Not Interested in Communicating |
| ... | ... | ... | ... |

It should be appreciated by those skilled in the art that the actual format and structure of user state/presence database 150 may vary and that the present invention is not so limited to any particular configuration. For example, user state/presence database 150 may be structured with a greater or lesser number of columns, and may be combined with another database, e.g., the users/devices database 120. Logically, user state/presence database 150 associates each user and the device(s) of the user with one of the four states as described above. A user may be available to communicate on more than one device at a time, such as voice and instant messaging (IM). In addition, a user may be available to communicate on one device while unable to communicate on another device. For example, a user may be at home and able to use POTS telephony or VoIP but her cell phone may have a dead battery, be turned off, or be out of range of a tower. Conversely, the user may be on the road and have access to her cell phone but not to her home phone.

An illustrative example of desired calls database 160 is as shown in Table 4.

TABLE 4

| CALLER | REQUIRED CALLEE(S) | OPTIONAL CALLEE(S) | PRIORITY | DESIRED MODE(S) |
|---|---|---|---|---|
| Paige Smith | Fred Jones, Bob Smith | | HIGH | Voice |
| Paige Smith | Betsy Lee | Amy Jones, Fred Brown | MEDIUM | Voice OR Voice AND Video |
| Paige Smith | Fred Brown | | MEDIUM | Voice |
| Paige Smith | Joe Jones | | LOW | Voice AND Video |
| Ali Brown | Tom Jones | | HIGH | Voice |
| Ali Brown | Paige Smith | | MEDIUM | Don't Care |
| ... | ... | ... | ... | ... |

It should be appreciated by those skilled in the art that the actual format and structure of desired calls database 160 may vary and that the present invention is not so limited to any particular configuration. Desired calls database 160 may be configured to maintain all the calls which are desired to occur for each user of the system 100. Each desired call represented by a row in Table 4 has one or more required other users, callee(s), to participate on the call, zero or more optional users, callee(s), that can participate if available, a priority for making the calls, such as High, Medium, or Low, and a desired mode(s) for communication. It should be understood by those skilled in the art that other types of priority designations or calling order designations may be utilized other than a system of High, Medium, or Low. For example, the priority order for each of the desired calls may be based upon a criterion of the time zone of the callee. In such a scenario, callee(s) in a time zone that is at night may be regarded as a lower priority callee compared to a callee whose time zone is currently in the daytime. With respect to examples of the desired mode(s) column, a caller may desire to communicate with a required callee either by voice or by video, may not care about the mode at all, or may wish to communicate either by voice or alternatively by a combination of voice and video.

System 100 may use network interface 115 to interact with communications network 110 through control interface 112. Commands may be provided to control interface 112 to set up a call between two or more parties, each of which has at least one user device 121 registered to the party in a given modality for each such device. Communications network 110 may use control interface 112 to alert system 100 through network interface 115 of a change of state of any user or device. When a change of state occurs, such an alert may be provided through network interface 115 to endpoint state monitor 130, which updates user state/presence database 150.

For example, a user at user device 121b may end a call on her cellular telephone or hang up on a POTS phone or VoIP phone in which case user state/presence database 150 may be updated from "Present" and "Already Communicating" to "Not Present" and "Available to Communicate." In another scenario, the user may put on her "away" message. Subsequently, user state/presence database 150 may change to "Present" and "Not Interested in Communicating." In still another scenario, the user may turn her device off or move the device out of range of a communication tower. In such a case, user state/presence database 150 may be updated to "Not Present" and "Not Available to Communicate." In still another scenario, the user may move back in range of a communication tower or may turn her device on, in which case user state/presence database 150 may be changed from "Not Present" and "Not Available to Communicate" to "Present" and "Available to Communicate."

When a change of state occurs, endpoint state monitor 130 may alert scheduler 170. Similarly, changes to user state/presence database 150 may be detected by scheduler 170. In such an event, scheduler 170 reviews desired calls database 160 at any time there is at least one user available to communicate. For users available to communicate, scheduler 170 evaluates whether there is a potential call that may be set up. To accomplish this arrangement, scheduler 170 may consider each desired call in priority order, such as highest priority first, and may determine whether the caller and the required user(s), callee(s), are "available to communicate" with each other at the desired mode(s) of communication. If a desired call is possible, scheduler 170 directs call setup module 180 to arrange the call. Call setup module 180 directs communications network 110 through network interface 115 and control interface 112 to arrange the call.

In addition, optional callee(s), if requested and/or available, may be added to the call. The difference between required callee(s) and optional callee(s) is that all required callee(s) must be in a state of "Available to Communicate" for scheduler 170 to cause a call to be arranged between the two or more parties, but scheduler 170 does not prevent a call from being arranged because one or more of the optional callee(s) are "Not Present." Various network elements 111, such as routers and conference bridges may be engaged depending on the nature of the call.

Commands may cause a voice call to be arranged between user device 121a and user device 121b, or a video call between user device 121a and user device 121c. Call manager 190 may manage the call as it occurs, including adding other parties during the call based on user requests, metering the call for billing, and/or moving the call from one sub-network and device to another sub-network or device, such as from a cellular network to a Wi-Fi network using the same dual-mode seamlessly mobile handset or from a cellular network and mobile handset to a PC and a VoIP connection across the Internet.

In accordance with other aspects of the present invention, system 100 may include a calendar module 195 configured to operate in conjunction with user calendar database 196 to maintain schedule information for at least one user. Calendar module 195 may be configured to cooperate with scheduler 170. For example, scheduler 170 may choose not to schedule a call involving a user if that user is due to be in a meeting shortly. Another example may be where scheduler 170 does not arrange calls to a mobile device of less than "High" priority if the callee is in a meeting. Calendar module 195 may be used to update user schedule information either through a separate network and user interface, such as a web browser and the Internet (not shown), or through in-band means such as network interface 115, communications network 110, and user devices 121a-121c.

Figure 2:
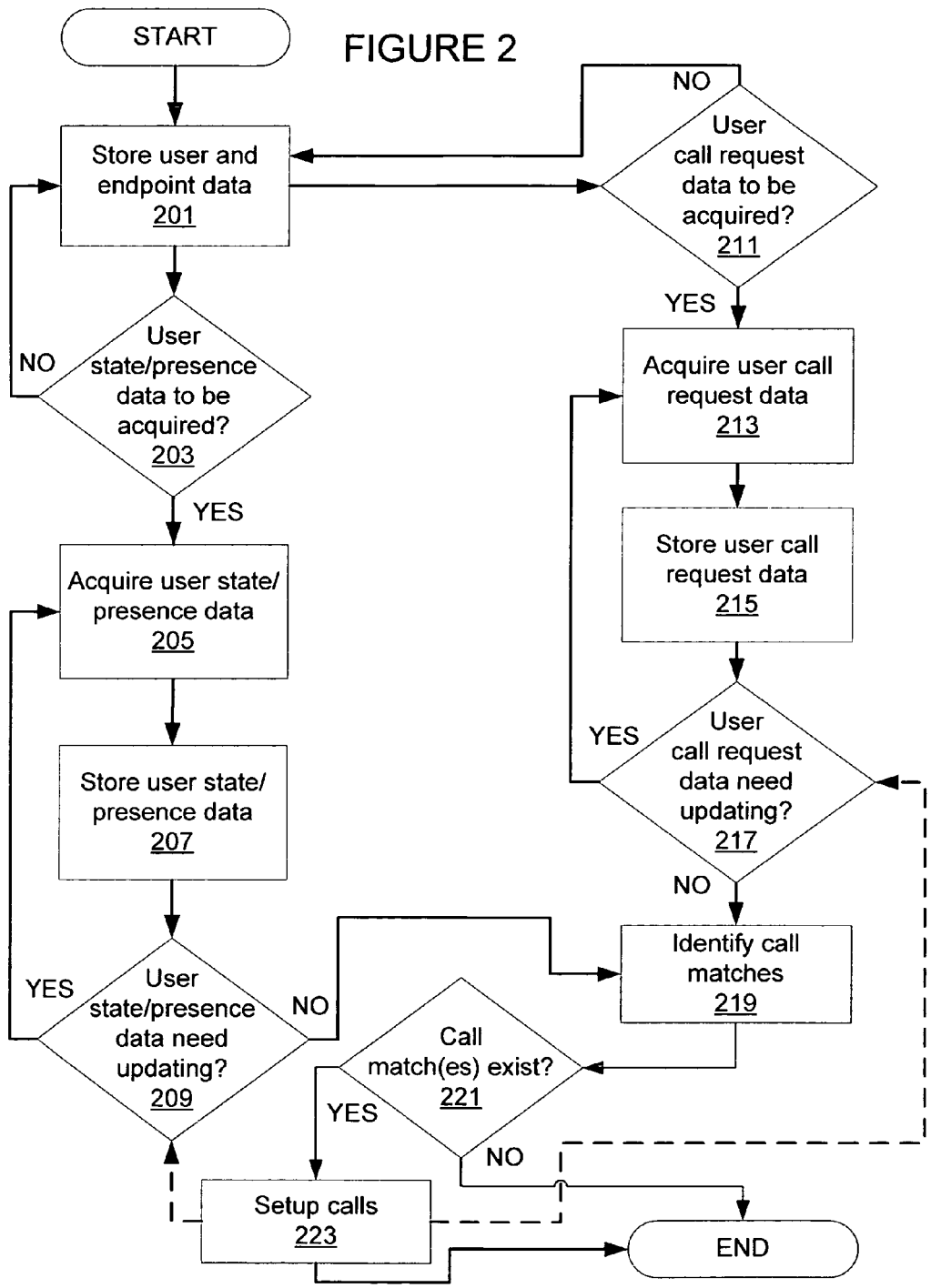
FIG. 2 is a flowchart of an illustrative example of a method for matching users in a conference call in accordance with at least one aspect of the present invention.

FIG. 2 is a flowchart of an illustrative example of a call request matching method for use in combination with a telecommunications system in accordance with at least one aspect of the present invention. The process starts and at step 201, information concerning user(s) and their endpoint communications device(s) is stored. Such information may be stored in the users/devices database 120 in FIG. 1. Proceeding to step 203, a determination is made as to whether user state/presence data is to be acquired. If not, the process returns to step 201. If user state/presence data is to be acquired, the process moves to step 205. Subsequent to storage of user and endpoint data in step 201, the process may also proceed to step 211 as described below.

For each of the devices and users, in step 205, presence and state information is acquired. At step 207, the user state/presence data is then stored. Such information may be stored in the user state/presence database 150 in FIG. 1. Proceeding to step 209, a determination is made as to whether the user state/presence data needs updating. If so, the process returns to step 205. Such an occurrence may be due to power being down, a power outage, or leaving a coverage range, user preferences, such as an "away" state, or calls beginning or ending. If the user state/presence data does not need updating in step 209, the process proceeds to step 219.

Subsequent to storage of user and endpoint data in step 201, at step 211, a determination is made as to whether user call request data is to be acquired. If no, the process returns to step 201. If user call request data is to be acquired in step 211, the process proceeds to step 213 where user call request data is acquired. Such an occurrence may occur in a number of ways. In one occurrence, a user specifies explicitly that she is desirous of contacting one or more parties, such as through a web browser interface. In another occurrence, by attempting to communicate with a second user unsuccessfully, that second user is added to a "call request" list of the first user. The call request list may be stored in the desired calls database 160 as shown in FIG. 1. At step 215, the user call request data is stored. As used herein, the determination of whether a call was successfully placed between at least two participants may include situations in which communication transpired between the at least two participants in addition to situations in which the system initiated a call between the participants, even if a "present" and "available to communicate" participant does not respond to the call.

Proceeding to step 217, a determination is made as to whether the user request data needs updating. Additional call requests for a user or different users may then be acquired by reiterating steps 213 and 215. In one embodiment, a user may specify that certain requests of the user be ignored. For example, Alice may wish to talk to Bob; however, Bob may be desirous of never talking to Alice and may block such requests from entering the queue. If Alice makes a call request requiring Bob and also requiring Carol, in accordance with one embodiment, the entire request may be denied. In accordance with another embodiment, the request to include Bob may be ignored and the request will be queued as a call request from Alice to Carol. If the user request data needs updating in step 217, the process returns to step 213. If not, the process proceeds to step 219.

From steps 209 and 217, at step 219, call matches are identified. In one embodiment, such call matches may be done in priority order. In another embodiment, duplicate symmetric matches may be considered to be the same match. For example, if Alice wants to talk with Bob and Bob wants to talk with Alice then the system may view such as a single match. A match exists when at least one party is desirous of communicating with at least one other party in at least one mode where all parties are currently present and available to communicate and there is at least one device for each party which is present and available supporting a desired mode of communications. Based on potential matches, calls are setup between the desired parties in step 221 and the process ends.

In accordance with at least one embodiment shown in broken line arrows in FIG. 2, a successful setup in step 221 may return the process to step 217 to determine if call request data needs updating to remove the call request from the queue. Also, the process may return to step 209 to determine if user state/presence data needs updating to change the state of each user who is now engaged in the call from "Present" and "Available to Communicate" to "Present" and "Already Communicating." As used herein, the determination of whether a call was successfully placed between at least two participants may include situations in which communication transpired between the at least two participants in addition to situations in which the system initiated a call between the participants, even if a "Present" and "Available to Communicate" participant does not respond to the call.

Figure 3:
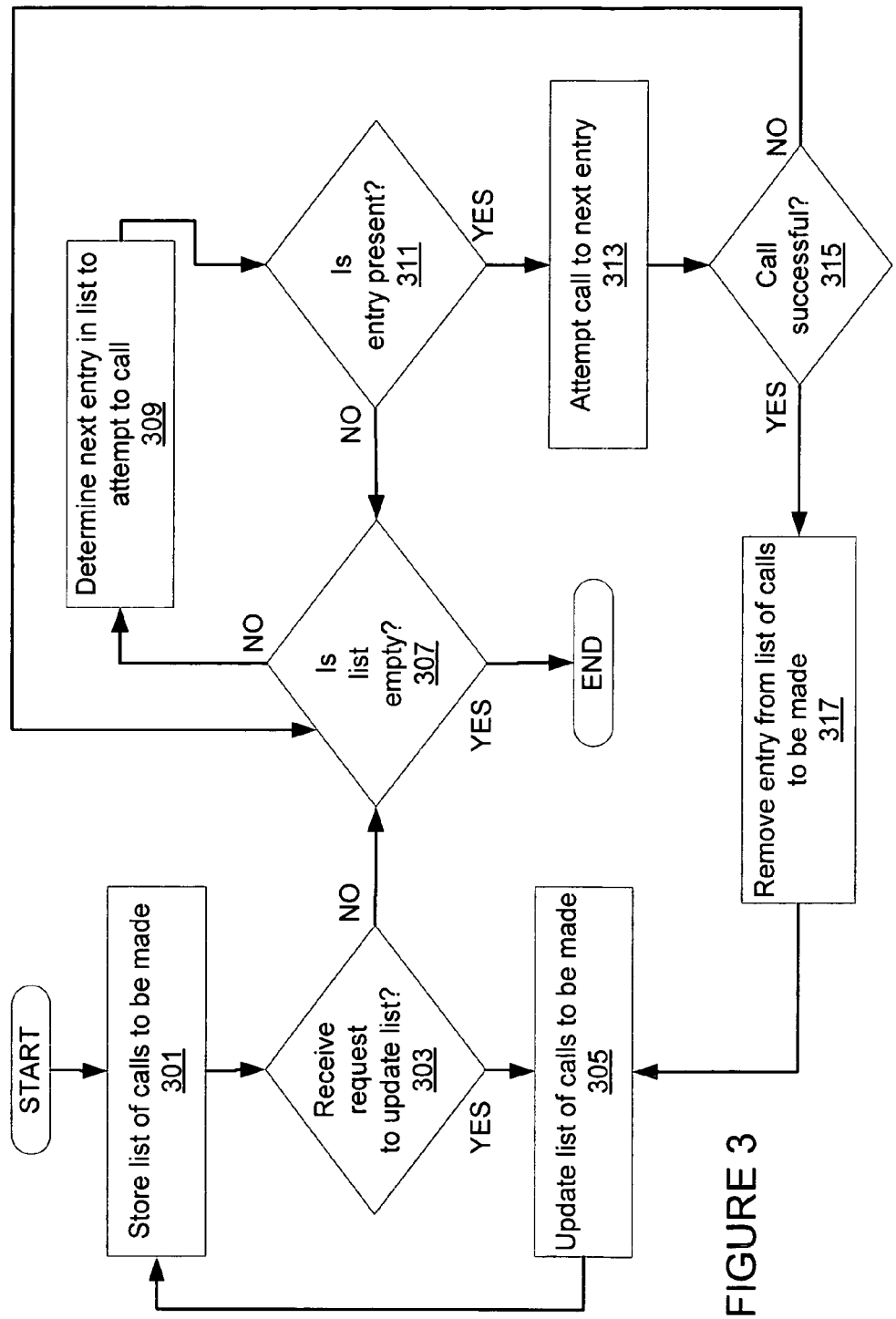
FIG. 3 is a flowchart of another illustrative example of a method for matching users in a conference call in accordance with at least one aspect of the present invention.

FIG. 3 is a flowchart of another illustrative example of a method for matching users in a conference call in accordance with at least one aspect of the present invention. The process starts at step 301 where a list of calls to be made is stored. Storage of such information may be contained within the desired calls database 160 of FIG. 1. At step 303, a determination is made as to whether a request has been received to update the list of calls to be made. If yes, the process moves to step 305 where the list of calls to be made is updated and the process returns to step 301. Such an occurrence may be in the case of a user explicitly deciding to not make a previously designated call to place or a successful call match having already occurred. If a request has not been received at step 303, the process moves to step 307.

At step 307, another determination is made as to whether the list of calls to be made is empty. If yes, such as when the user has no more desired calls to make, the process ends. If the list is not empty, the method proceeds to step 309 where the next entry in the list to attempt to call is determined. The determination of step 309 may be based upon a particular criterion. For example, a priority level may be designated to attempt High priority calls first. Other criteria include desired or required modes of conversation, such as, whether a callee is on her cellular phone, only if the callee is on a land line, or only when the callee may view a document because she is present at her PC. Other criteria include the local time of the callee and whether the callee is primarily a personal contact or a work contact.

Proceeding to step 311, a determination is made as to whether the next entry is "Present" in the list of calls to be made. If the next entry is "Not Present," the process returns to step 307. If the next entry is currently listed as "Present," the process proceeds to step 313 where an attempt to call the next entry is made. A determination is made, at step 315, as to whether the attempt was successful. If not, the process returns to step 307. If the call was successful, the process moves to step 317 where the entry corresponding to the successful call is removed from the list of calls to be made and the process returns to step 305. As used herein, the determination of whether a call was successfully placed between at least two participants may include situations in which communication transpired between the at least two participants in addition to situations in which the system initiated a call between the participants, even if a "Present" and "Available to Communicate" participant does not respond to the call.

Figure 4A:
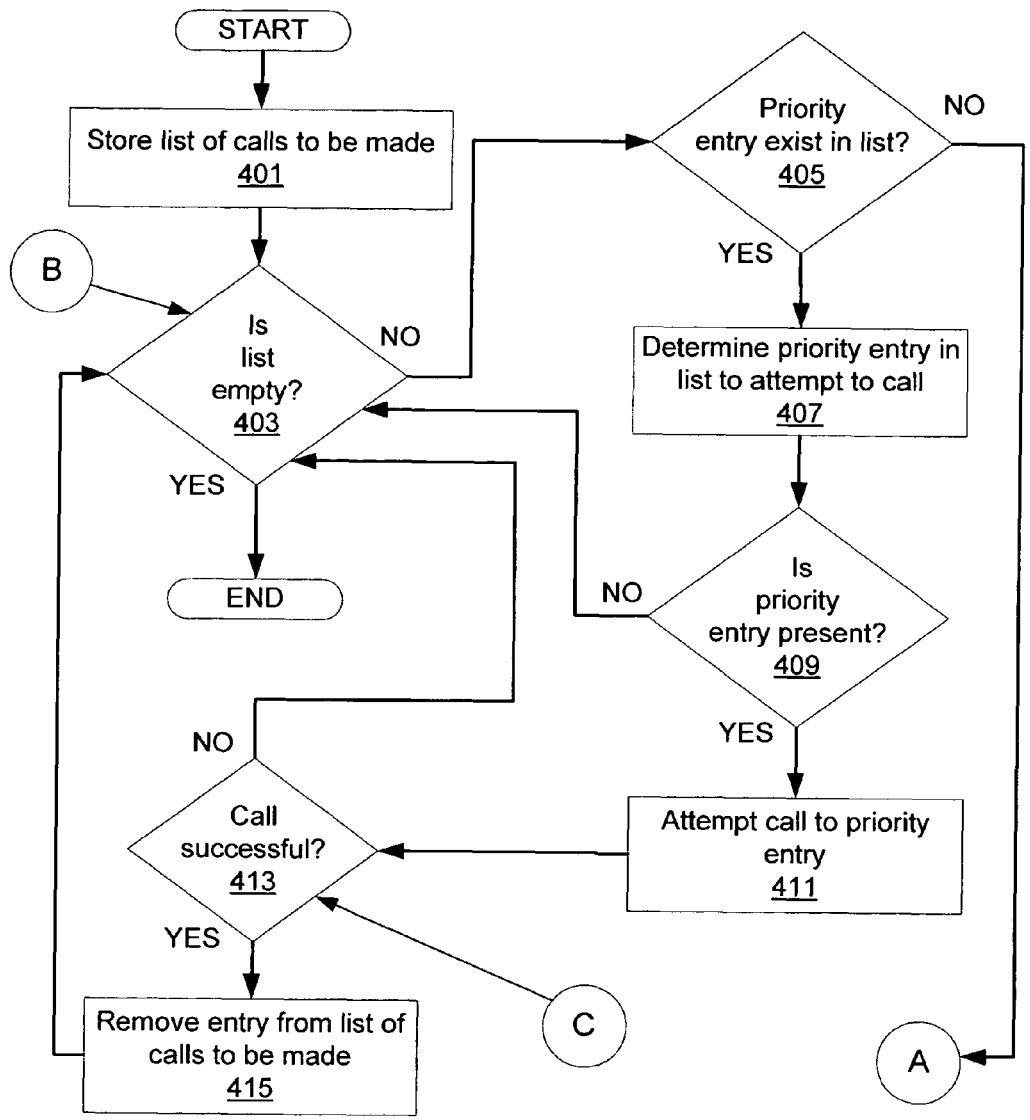
FIGS. 4A-4B illustrate a flowchart of another example of a method for matching users in a conference call in accordance with at least one aspect of the present invention.
Figure 4B:
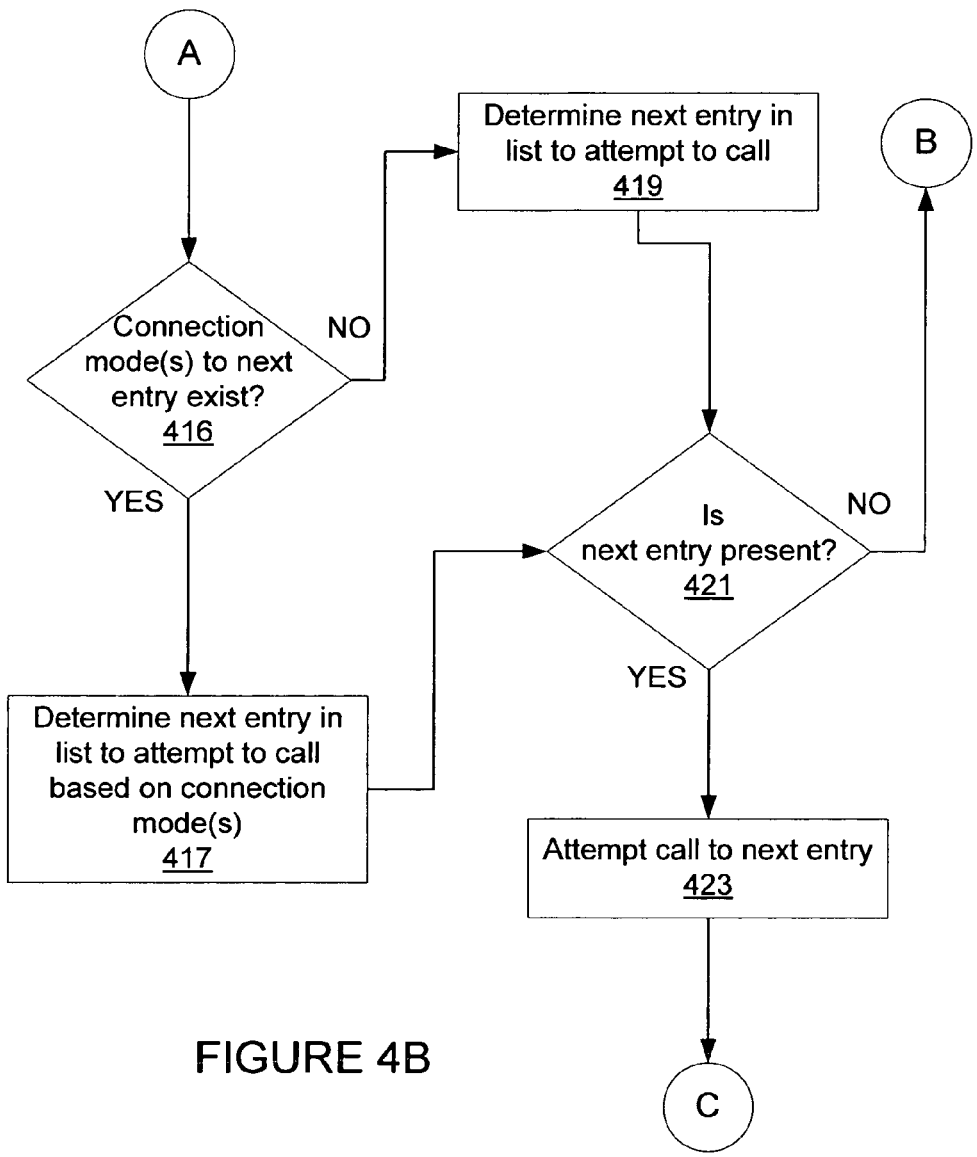

FIGS. 4A-4B illustrate a flowchart of another example of a method for matching users in a conference call in accordance with at least one aspect of the present invention. The process starts at step 401 where a list of calls to be made is stored. Storage of such information may be contained within the desired calls database 160 of FIG. 1. At step 403, a determination is made as to whether the list of calls to be made is empty. If yes, the process ends. If the list is not empty in step 403, the process moves to step 405 where another determination is made as to whether a priority entry exists in the list of calls to be made. Such an example may be a situation in which a desired call is listed with a priority of High. If a priority entry does no exist in the list of calls to be made, the process proceeds to step 416 as described below. Is a priority entry does exist in step 405, the method proceeds to step 407.

At step 407, the priority entry in the list is determined. Such a determination may be based on choosing the priority entry with the highest designated priority. At step 409, a determination is made as to whether the priority entry is "Present." If not, the process returns to step 403. If the determined priority entry is "Present," at step 411, a call to the priority entry is attempted. A determination as to the success of the attempted call is made at step 413. If the attempt is not successful, the process returns to step 403. If the attempt is successful in step 413, then, at step 415, the entry is removed from the list of calls to be made and the process returns to step 403. As used herein, the determination of whether a call was successfully placed between at least two participants may include situations in which communication transpired between the at least two participants in addition to situations in which the system initiated a call between the participants, even if a "Present" and "Available to Communicate" participant does not respond to the call.

Returning to the determination in step 405 that a priority entry does not exist in the list of calls to be made, the process moves to step 416 where a determination is made as to whether a connection mode(s) requirement exists for connecting to the next entry in the list of calls to be made. If yes, the next entry in the list is determined based upon the required communication mode(s) at step 417 before proceeding to step 421. If a connection mode(s) requirement does not exist for connecting to the next entry in the list at step 416, the process proceeds to step 419 where the next entry in the list is determined before proceeding to step 421. At step 421, a determination is then made as to whether the next entry in the list is present. If the next entry is not present, the process returns to step 403. If the next entry is present in step 421, the process moves to step 423 where an attempt to the next entry is made before returning to step 413.

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present invention. The description is thus to be regarded as illustrative instead of restrictive on the present invention.

I claim:

1. A method for placing a call between a caller and a callee, comprising:
   creating a plurality of call requests, each of the call requests specifying a caller, a callee, a priority level of the call request, and at least one desired mode of communication, each of the call requests being created in response to a failed attempt to make an initial call between the respective specified caller and callee;
   storing the call requests in a database;
   acquiring, for each of the specified callers and callees, information indicating a current availability to communicate via each of the desired modes of communication;
   selecting a first call request having a highest priority level among the stored call requests;
   determining a desired mode of communication via which the specified caller and callee of the first selected call request are both currently available to communicate; and
   directing a communications network to place a call between the specified caller and callee of the first selected call request via the determined mode of communication.

2. The method of claim 1, further comprising:
   determining whether the call was successfully placed; and
   updating the database.

3. The method of claim 2, wherein upon determining that the call was successfully placed, the database is updated by removing the first selected call request from the database.

4. The method of claim 2, wherein upon determining that the call was not successfully placed, the database is updated by changing a designation of the first selected call request.

5. The method of claim 1, wherein acquiring the information corresponding to a current availability to communicate includes:
   determining presence data corresponding to the caller and the callee; and
   determining state data corresponding to the caller and the callee,
   wherein the information corresponding to a current availability to communicate includes the determined presence data and the determined state data.

6. The method of claim 1, wherein the acquired information includes user defined information.

7. A system for placing a call between a caller and a callee, comprising:
   a database which stores a plurality of call requests, each of the call requests specifying a caller, a callee, a priority level of the call request, and at least one desired mode of communication, each of the call requests being created in response to a failed attempt to make an initial call between the respective specified caller and callee;
   a scheduler which is configured to:
     acquire, for each of the specified callers and callees, information indicating a current availability to communicate via each of the desired modes of communication;
     select a first call request having a highest priority level among the stored call requests; and
     determine a desired mode of communication via which the specified caller and callee of the first selected call request are both currently available to communicate; and
   a call setup module which is configured to direct a communications network to place a call between the specified caller and callee of the first selected call request via the determined mode of communication.

8. The method of claim 1, further comprising:
   selecting a second stored call request having a highest priority level among the remaining stored call requests, if at least one of the specified caller and the specified callee of the first selected call request is not currently available to communicate;
   determining whether the specified caller and callee of the second selected call request are both currently available to communicate; and
   directing the communications network to place a call between the specified caller and callee of the second selected call request if the specified caller and callee are both currently available to communicate.

9. The system of claim 7, further comprising:
a calendar database configured to maintain a schedule of availability to communicate of the callees; and
a calendar module, operatively connected to the calendar database and the scheduler, configured to update the calendar database and to provide data corresponding to the schedule of availability to communicate to the scheduler for use in selecting a call request.

10. The system of claim 7, wherein the scheduler is further configured to:
select a second stored call request having a highest priority level among the remaining stored call requests, if at least one of the specified caller and the specified callee of the first selected call request is not currently available to communicate; and
determine whether the specified caller and callee of the second selected call request are both currently available to communicate; and
the call setup module is further configured to direct the communications network to place a call between the specified caller and callee of the second selected call request if the specified caller and callee are both currently available to communicate.

* * * * *